(12) United States Patent
McLean et al.

(10) Patent No.: US 7,574,851 B1
(45) Date of Patent: Aug. 18, 2009

(54) FLEXIBLY MOUNTED SIDE DEFLECTOR

(75) Inventors: Kenneth W. McLean, New Holland, PA (US); Robert L. Rice, New Holland, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/058,336

(22) Filed: Mar. 28, 2008

(51) Int. Cl.
*A01D 43/00* (2006.01)
(52) U.S. Cl. ....................................... 56/192
(58) Field of Classification Search ........... 56/1, 56/192, 181, 182, 189, 14.5, 14.9, 15.5, 15.9, 56/17.4, 370, 372
See application file for complete search history.

(56) References Cited

U.S. PATENT DOCUMENTS

| | | | |
|---|---|---|---|
| 2,507,635 A | 5/1950 | James | |
| 3,803,821 A | 4/1974 | Peacock et al. | |
| 4,022,005 A * | 5/1977 | Case | 56/372 |
| 4,217,746 A | 8/1980 | Cicci et al. | |
| 4,858,419 A | 8/1989 | Bernier | |
| 5,133,175 A | 7/1992 | Dumbrell | |
| 5,351,468 A * | 10/1994 | Pominville | 56/192 |
| 5,930,988 A | 8/1999 | Hanson | |
| 6,415,590 B1 | 7/2002 | Lohrentz | |
| 6,694,715 B2 | 2/2004 | Schoenherr | |
| 6,775,968 B2 | 8/2004 | Carlot et al. | |
| 6,857,256 B2 | 2/2005 | Strange et al. | |
| 6,971,224 B1 | 12/2005 | Hancock | |
| 7,028,459 B2 * | 4/2006 | Lohrentz et al. | 56/192 |

* cited by examiner

*Primary Examiner*—Robert E Pezzuto
(74) *Attorney, Agent, or Firm*—Patrick M. Sheldrake; John William Stader; Michael G. Harms

(57) ABSTRACT

A side deflector for a windrow merger apparatus having flexibly connected first and second portions connected by a plurality of extension springs. The first portion of the side deflector is pivotally connected to the merger apparatus in a manner enabling pivotal movement between operating and non-operating positions. The second portion of the side deflector is connected by the plurality of springs thereby enabling relative movement between the first and second portions and preventing damage to the deflector when the deflector encounters obstacles while maintaining the first and second portions in proper alignment under normal operating conditions.

12 Claims, 3 Drawing Sheets

ROCK

FLEXIBLY MOUNTED SIDE DEFLECTOR

BACKGROUND OF THE INVENTION

The present invention relates to agricultural windrowers and, more particularly, to a mounting apparatus for a discharge deflector for a merger mechanism used for conveying crop material to one side of a windrower.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Current practice in agriculture is to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as chopping or baling.

Improving the current practice is to combine multiple windrows together as they are being mowed. This improvement eliminates a raking operation and also reduces the number of passes of subsequent harvesting operations (e.g., chopping and baling). With the advent of higher capacity forage harvesters and balers, merging windrows is become a more desirable practice. Windrow merging attachments are thus becoming more prevalent on harvesting machines. Mergers generally comprise a conveyor belt for receiving crop from the header and directing the crop laterally for discharge alongside the windrower. Deflectors may be incorporated at the end of the conveyor to direct crop downward from the conveyor end to the ground. Moving the deflector out of the crop path allows the conveyor to propel crop material to a position on the ground further displaced from the end of the conveyor. Deflectors provide additional flexibility in windrow placement for merging operations.

Deflectors, because of their placement, are subject to damage. When lowered, the deflector may extend close to the ground where it may be impacted by obstructions such as rocks. When raised, the deflector may extend significantly beyond the outside of the windrower drive tire where it may also be impacted by obstructions such as fences or other equipment. Such impacts may cause damage to the deflector shield, the deflector mount, or both and result in lost productivity while repairs are made.

It would be a great advantage to provide an improved deflector apparatus for a windrow merger that overcomes the above problems and disadvantages.

SUMMARY OF THE INVENTION

Accordingly, it is an object of the present invention to provide an improved side deflector for a windrow merger apparatus that is less susceptible to damage caused by encounters with obstacles.

It is a further object of the present invention to provide a durable side deflector for a windrow merger allowing selective control of the location where crop is to be deposited.

It is a further object of the present invention to provide a movable side deflector for a windrower merger apparatus that allows deflection of a portion of the shield structure when impacted by obstacles without damage to the deflector mounting or movement mechanism.

It is a further object of the present invention to provide a side deflector for a windrower merger apparatus that features a flexible connector between adjacently positioned portions of the deflector that enables relative movement between the two deflector portions.

It is a still further object of the present invention to provide a side deflector for a windrower merger apparatus having adjacently positioned deflector portions connected by a flexible connector and wherein the flexible connector maintains the deflector portions in an operable alignment during normal operating conditions.

It is a still further object of the present invention to provide a windrow merger deflector apparatus that is durable in construction, inexpensive of manufacture, carefree of maintenance, easily assembled, and simple and effective to use.

These and other objects are achieved by providing a side deflector for a windrow merger apparatus having flexibly connected first and second portions connected by a plurality of extension springs. The first portion of the side deflector is pivotally connected to the merger apparatus in a manner enabling pivotal movement between operating and non-operating positions. The second portion of the side deflector is connected by the plurality of springs thereby enabling relative movement between the first and second portions and preventing damage to the deflector when the deflector encounters obstacles while maintaining the first and second portions in proper alignment under normal operating conditions.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
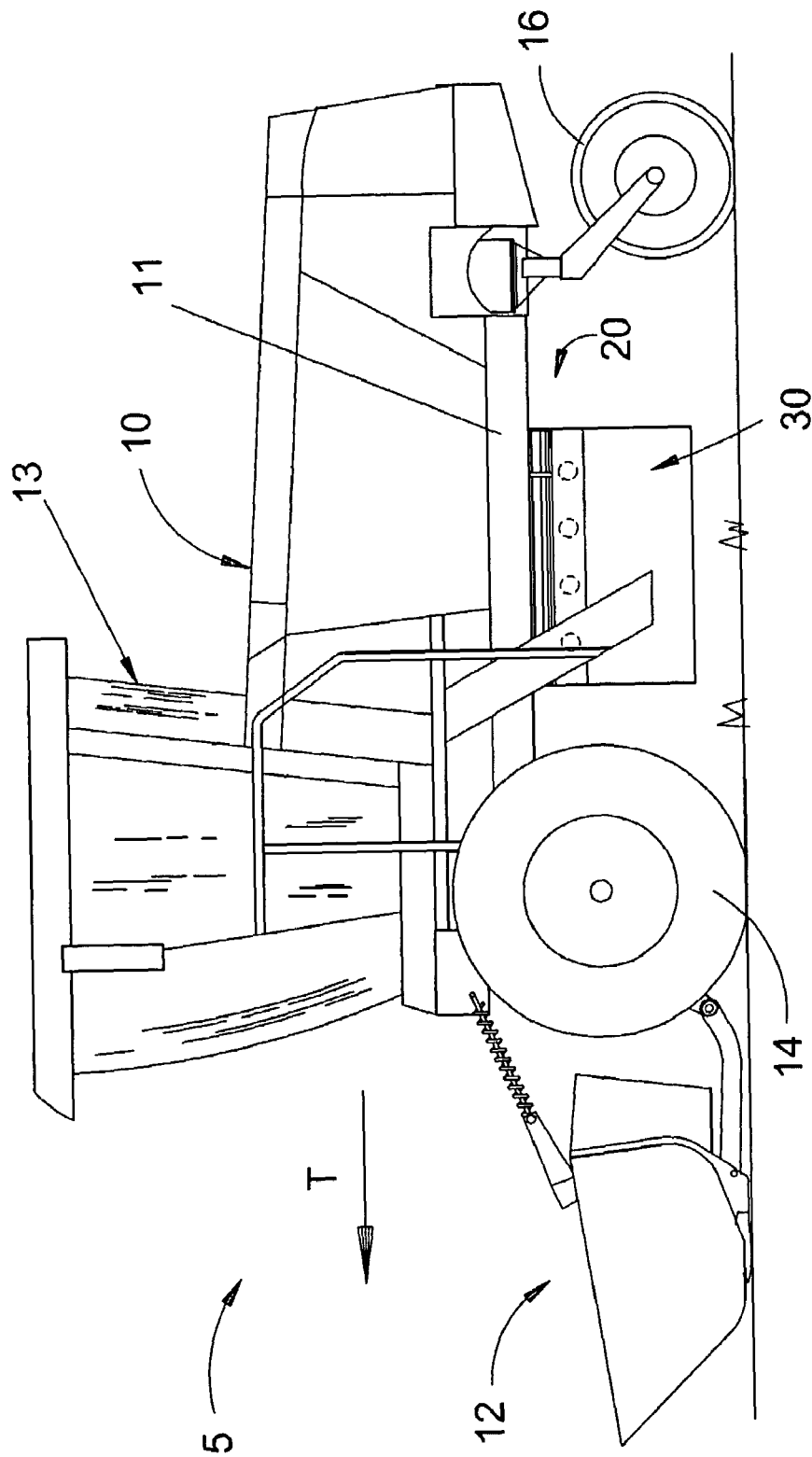
FIG. 1 is a side elevation view of a typical self-propelled windrower of the type on which the present invention is useful.

FIG. 1 shows a side view of a typical self-propelled windrower 5 used for harvesting a crop material as it travels across the ground in the direction indicated by arrow "T." Usually, a tractor 10 pushes a header 12 which severs the crop material from the ground by a sickle-bar, rotary cutter or other functionally equivalent cutting means. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material is urged toward the center of the header where it may be conditioned prior to discharge from the header. The crop is then ejected rearwardly from the header 12, generally in the space between the drive wheels 14 whereupon it falls to the ground. Shields (not shown) are used to arrange the crop into a windrow that is formed generally along the longitudinal axis of the windrower.

Windrower 10 also includes a merger apparatus 20 which is positioned and supported under chassis 11 for directing crop material being discharged from header 12 to a location transversely displaced from the longitudinal centerline of the windrower 5. In this manner, windrows of harvested crop material may be positioned for combination (merging) with the harvested crop material from a previous separate pass by the windrower, usually when the windrower travels in the opposite direction along an adjacent path. One such example of a windrower merger apparatus on which the present invention is useful is disclosed in U.S. patent application Ser. No. 11/949,967, filed on Dec. 4, 2007 which is incorporated in its entirety by reference herein.

Figure 2:
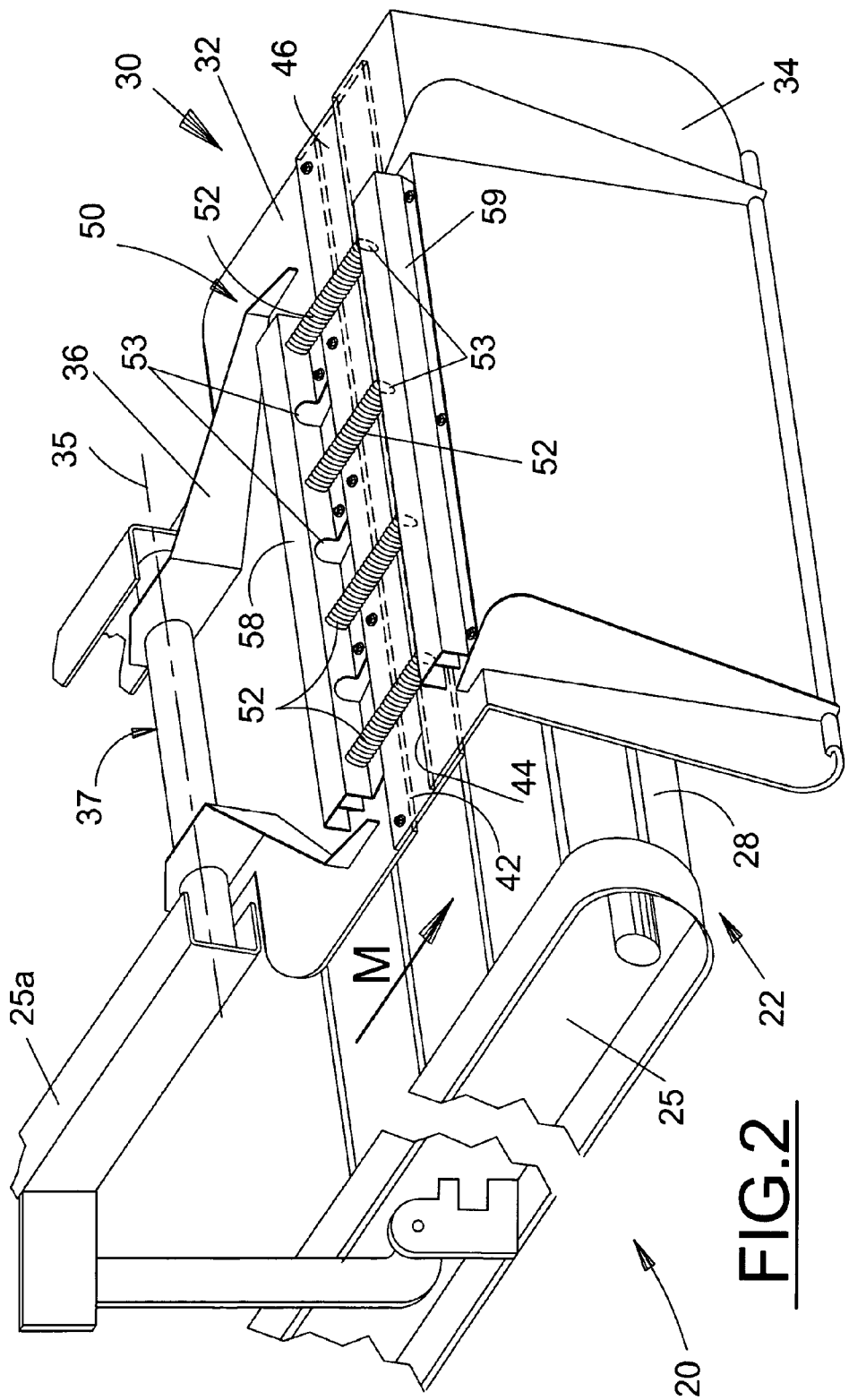
FIG. 2 is a partial perspective view of the discharge end of the windrow merger apparatus showing a deflector incorporating one embodiment of the present invention.

Referring to FIG. 2 wherein the discharge end 22 of the merger apparatus 20 is shown to include a generally rectangular support frame 25 supporting an endless loop-style conveyor 28 for moving crop material on its top surface generally in the direction indicated by arrow "M." The surface of conveyor 28 may feature raised ribs or other protrusions for engaging the crop material and urging it in the direction of conveyor movement. Rotational energy for the conveyor is typically provided by a hydraulic drive means (not shown). Deflector 30 is positioned adjacent to the discharge end 22 of the merger conveyor 28 for directing the location on the ground of crop material being discharged from the conveyor 28. Deflector 30 comprises an upper portion 32 and a lower portion 34, each portion having working surface for directly contacting and directing the crop material. Upper portion 32 includes pivot assembly 36 which is connected by pivot connector 37 to a sub-frame 25a. Sub-frame 25a is, in turn, connected to support frame 25 for movement therewith. The pivot assembly 36 enables the deflector 30 to be pivoted about axis 35 and positioned in an operating or engaged position (shown) for depositing crop material in a windrow generally adjacent to the discharge end of the merger apparatus. Alternatively, the deflector 30 may also be pivoted to a raised, disengaged position when it is desired to deposit crop material a greater distance from the end of the merger apparatus. In the disengaged position, lower portion 34 is positioned above the crop material trajectory so that the deflector does not impede or otherwise influence crop material movement. The speed of conveyor 28 and the crop trajectory as it is expelled from the discharge end allows significant lateral placement of crop material, on the order of several feet. Lower portion 34 extends into the crop path when the deflector is lowered into the operating position.

Figure 3:
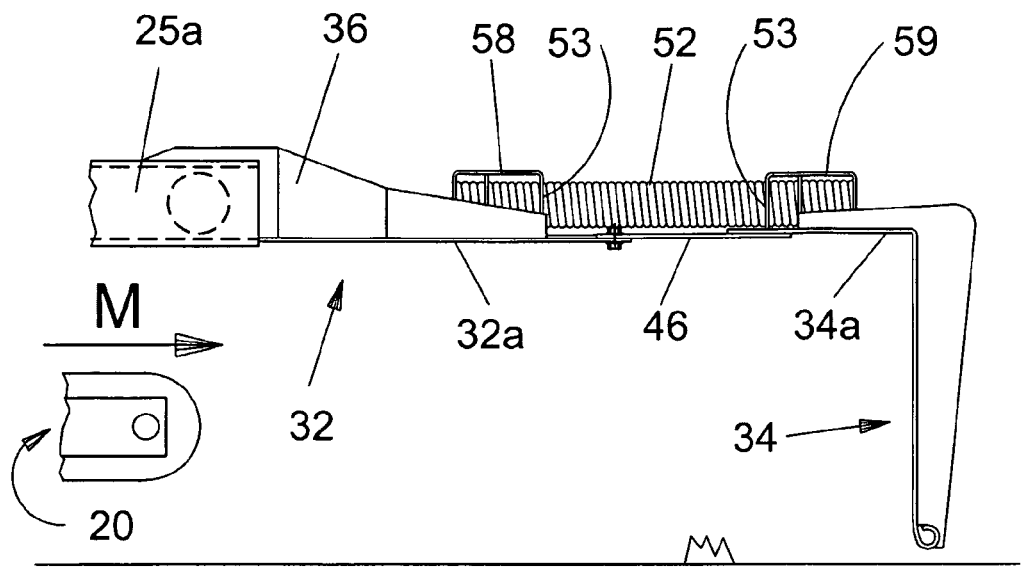
FIG. 3 is an elevation view of the present invention shown in a working position.

Upper portion 32 also includes a terminal edge 42 defined by the direction of crop movement and oriented generally perpendicular to the direction of crop movement from the conveyor. Lower portion 34 includes a leading edge 44 which is positioned adjacent to and downwardly (relative to the direction of crop movement) from terminal edge 42 when the upper and lower portions are configured in the working position, as shown in FIGS. 2 and 3. Terminal edge 42 and leading edge 44 are normally separated by small gap to allow relative movement between the upper and lower portions without contact of the edges 42, 44. The working surfaces 32a, 34a of the upper and lower portions 32, 34, are generally co-planar in the area adjacent to the gap to minimize obstructions to the flow of crop material. Lower portion 34 is connected to upper portion through a flexible connector 50 which allows relative movement between the upper and lower portions, but maintains the two portions in proper relationship to each other under normal operating circumstances. Flexible connector 50 comprises an upper retainer 58, and lower retainer 59, and a plurality of elongate extension springs 52 retained at each end, respectively, by spring retainers 53 formed in upper and lower retainer structures 58, 59. Extension springs 52 extend between the generally opposing spring retainer structures 58, 59. Upper retainer structure 58 is connected to upper portion 32 while lower retainer structure 59 is connected to lower portion 34. Extension springs 52 are normally in a fully retracted when the deflector is in an operable configuration and thus maintain leading edge 44 and trailing edge 42 generally parallel and the adjacent edge surfaces 32a, 34a of the upper and lower portions generally co-planar, also referred to as the normal operation position of the deflector 30. The stiffness and/or number of extension springs may be varied so that the upper and lower portions are maintained in the proper working relationship, as shown in FIG. 3, even when subject to the force of the crop material being discharged from the merger conveyor 28. Additional spring retainers in the upper and lower retainer structures to enable easy adjustment of the flexible connector stiffness to suit crop conditions.

Figure 4:
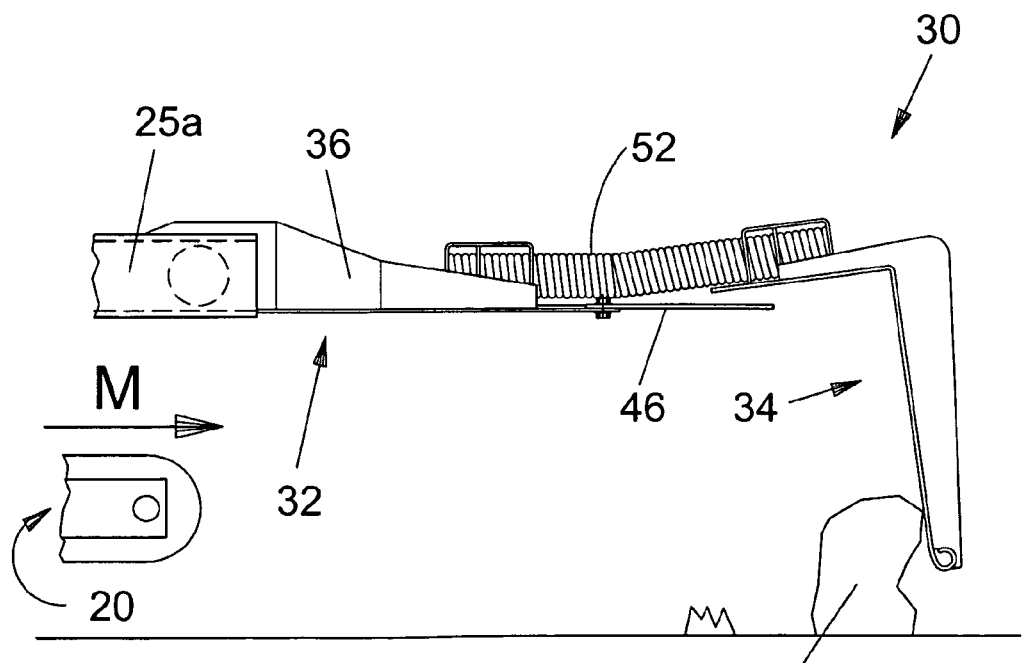
FIG. 4 is an elevation view of the present invention shown in a deflected position in response to an encounter with an obstacle on the ground.

In the event that the deflector encounters an obstacle as the windrower proceeded across the ground, extension springs 52 will bend and allow lower portion 34 to be repositioned by the obstacle to a deflected position, as best shown in FIG. 4. The lack of other hard connections, such as a hinge or pivot pin connection, allows the lower portion 34 to move multi-directionally relative to upper portion 32, within the limits of the extension springs 52, reducing the chances that the deflector 30 or its mounting connection to the merger chassis, pivot assembly 36, will be damaged during the obstacles encounter. After passing over the obstacle, extension springs 52 will return to their normal, unextended position and move the lower portion 34 to its normal working position, shown in FIG. 3.

The gap between upper and lower portions 32, 34 is preferably covered by a flexible filler panel 46 to prevent clogging of crop material in the gap or extension springs. Filler panel 46 is connected to upper portion 32 by fasteners of other conventional means. The selected material is sufficiently flexible to allow movement yet sufficiently stiff to withstand the crop movement across the panel surface without deforming into the gap. The selected material must also be sufficiently durable to withstand the passage of crop material across the surface. In one embodiment, filler panel 46 is made from high density polyethylene (HDPE) sheet approximately 0.125 inch thick. Other materials may be equally suitable and allow a balance between flexibility and durability to be optimized.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. A deflector for selectively directing the motion of a crop discharged from a windrow merger apparatus used on an agricultural windrower, the deflector comprising:
    a first portion having a first planar surface and having a pivot mount for pivotal connection to the merger apparatus and an elongate first interface edge;
    a second portion having a second planar surface and having an elongate second interface edge disposed generally adjacent to said first interface edge; and
    a plurality of elongate springs connecting said first portion to said second portion, each spring affixed at one end to said first portion and at an opposing end to said second portion thereby enabling said second portion to move in relation to said first portion by extension of said plurality of springs; and
    the springs configured such that in a first orientation the first planar surface and second planar surface are generally coplanar and a flexible member connected to one of the portions extends substantially across the length of a gap between the first and second portions.

2. The deflector of claim 1, wherein each of said plurality of springs is an extension spring having a retracted state and an extended state, said first portion and said second portion being maintained in a normal operating relationship with respect to each other when said plurality of springs are in said retracted state, said first portion and said second portion being maintained in a deflected operating relationship when said plurality of springs are in said extended state.

3. The deflector of claim 1, wherein in the first orientation the flexible member extends substantially across the entire gap.

4. The deflector of claim 1, wherein said plurality of springs alone manage the spatial relationship between said first portion and said second portion and allow movement.

5. The deflector of claim 4, wherein the number of springs comprising said plurality of springs may be varied.

6. A deflector for selectively directing the position on the ground of a crop discharged from a merger apparatus used on an agricultural windrower, the merger apparatus having a frame structure supporting a conveyor, the conveyor for receiving the crop from a cutting header on the windrower and transporting the crop in a direction generally transverse to the direction of movement of the windrower toward a discharge end, the deflector being selectively positionable for directing crop discharged from the conveyor and comprising:
    a first portion having a first planar surface and having a pivot mount for pivotal connection to the merger apparatus and an elongate first interface edge; and a first plurality of receptacles;
    a second portion having a second planar surface and having an elongate second interface edge and separated therefrom by a gap, and a second plurality of receptacles, and
    a plurality of springs retained by and extending between said first and second plurality of receptacles thereby connecting said first portion to said second portion and enabling said second portion to move in relation to said first portion by extension of said plurality of springs; and
    the springs configured such that in a first orientation the first planar surface and second planar surface are generally coplanar and a flexible member connected to one of the portions extends substantially across the length of the gap.

7. The apparatus of claim 6, wherein each of said plurality of springs is an extension spring having a retracted state and an extended state, said first portion and said second portion being maintained in a normal operating relation when said plurality of springs are in said retracted state, said first portion and said second portion being maintained in a deflected operating relation when said plurality of springs are in said extended state.

8. The deflector of claim 7, wherein said first and second interface ends are separated by said gap when said first and second portions are in said normal operating relation and the first and second plurality of receptacles are connected to a rear side of both the first and second portions respectively such that the plurality of springs traverse the length of the gap on a rear side of the flexible member.

9. The deflector of claim 8, wherein the number of springs comprising said plurality of springs may be varied.

10. In an agricultural windrower for movement across the ground having a header apparatus for severing a crop from the ground and transporting it to a central pickup location, a merger conveyor system for receiving the crop from the central pickup location and transporting the crop in a direction generally transverse to the direction of movement of the windrower to a discharge end, the merger connected to the windrower and supported by a support structure, and a deflector pivotally connected to the support structure and disposed adjacent the discharge end having a non-operating position and a operating position for selectively directing the location of crop discharged onto the ground as it is conveyed from the discharge end, the improvement in the deflector comprising:
    a first portion having a first planar surface and a pivot mount for pivotal connection to the support structure and an elongate first interface edge;
    a second portion having a second planar surface and an elongate second interface edge disposed generally adjacent to said first interface edge; and
    a plurality of elongate springs, each affixed at one end to said first portion and at the opposing end to said second portion, thereby supporting said second portion and enabling it to move in relation to said first portion by deflection of said plurality of springs, and
    the springs configured such that in a first orientation the first planar surface and second planar surface are generally coplanar and a flexible member connected to one of the portions extends substantially across the length of a gap between the first and second portions.

11. The improvement of claim 10, wherein each of said plurality of springs is an extension spring having a retracted state and an extended state, said first portion and said second portion being maintained in a normal operating relation when said plurality of springs are in said retracted state, said first portion and said second portion being maintained in a deflected operating relation when said plurality of springs are in said extended state.

12. The improvement of claim 10, wherein the number of springs comprising said plurality of elongate springs may be varied.

* * * * *